United States Patent [19]
Bratten

[11] Patent Number: 5,624,579
[45] Date of Patent: Apr. 29, 1997

[54] METHOD OF SIMULTANEOUSLY INDEXING PERMANENT AND DISPOSABLE FILTER MEDIA IN A VACUUM FILTER APPARATUS

[76] Inventor: Jack R. Bratten, 5970 St. James Dr., West Bloomfield, Mich. 48322

[21] Appl. No.: 535,546

[22] Filed: Sep. 28, 1995

Related U.S. Application Data

[62] Division of Ser. No. 813,161, Dec. 24, 1991, abandoned.

[51] Int. Cl.$^6$ .................. B01D 37/00; B01D 33/00
[52] U.S. Cl. .................. 210/783; 210/387; 210/400; 210/401; 210/406
[58] Field of Search .................. 210/387, 400, 210/406, 401, 783

[56] References Cited

U.S. PATENT DOCUMENTS

| | | |
|---|---|---|
| 3,087,620 | 4/1963 | Hirs . |
| 3,221,885 | 12/1965 | Hirs . |
| 3,741,389 | 6/1973 | Anderson .................. 210/387 |
| 4,137,062 | 1/1979 | Mullerheim et al. .................. 210/387 |
| 4,220,539 | 9/1980 | Lee .................. 210/387 |
| 4,396,505 | 8/1983 | Wilson et al. .................. 210/387 |
| 4,514,301 | 4/1985 | Parshall .................. 210/400 |
| 5,417,850 | 5/1995 | Schimion et al. .................. 210/387 |

*Primary Examiner*—Robert J. Popovics
*Attorney, Agent, or Firm*—John R. Benefiel

[57] ABSTRACT

A filter apparatus for removing solids from a liquid in which chain conveyor loops frictionally engage a segment of a continuous permanent filter media belt extending across the bottom of a tank over a perforate section through which liquid is withdrawn to be filtered. The chain conveyor loops and permanent filter media follow divergent paths after exiting the tank, the chain loops returning over the top of the tank, the permanent filter media belt returning beneath the tank to a point of entrance at the top of a rear tank wall. A disposable media belt is optionally introduced at the point the permanent media belt and chain conveyor loops reconverge at the entrance point of the tank at the rear wall. The chain conveyor loops are indexed periodically and frictionally engage the permanent media belt (and disposable media, if used) in the segment extending across the tank bottom to cause the belt media to likewise be indexed.

1 Claim, 2 Drawing Sheets

METHOD OF SIMULTANEOUSLY INDEXING PERMANENT AND DISPOSABLE FILTER MEDIA IN A VACUUM FILTER APPARATUS

CROSS-REFERENCE TO RELATED APPLICATION

This application is a division of U.S. Ser. No. 07/813,161, filed Dec. 24, 1991, now abandoned.

BACKGROUND OF THE INVENTION

The present invention concerns liquid filtration apparatus of the type including an open tank adapted to receive a liquid to be filtered, with a media belt extending over a "vacuum box" having a perforate cover located in a section of the bottom of the tank. Liquid is drawn through the media in order to be filtered and into the vacuum box for recirculation to the system using the liquid. The media belt is periodically indexed to bring a fresh section of the media belt over the vacuum box and to carry accumulated solids out of the tank.

Various arrangements have heretofore been employed in such filters. A chain conveyor is often employed, having chain loops running along either edge of the belt, advance of the chain loops causing advance of the media belt by a frictional engagement of segments of the chain loops lying atop the media belt edges on the tank bottom. These chain loop segments also seal the edges of the media belt by their weight. Chain flights extending across the belt are used to increase frictional engagement and to enable large masses of accumulated solids atop the media belt to be more easily advanced out of the tank.

The media belt has sometimes consisted of a disposable material such as paper or woven material which is fed off a roll at one end of the tank into the space between the conveyor chain and passed into a collection receptacle. U.S. Pat. No. 3,087,620 describes such a filter.

It is sometimes desirable to use a recirculated permanent media belt, each segment of which must be cleansed prior to being repositioned over the vacuum box.

Heretofore, where a chain conveyor is used, such permanent media belts have been recirculated through the same path as the chain conveyor. A problem with this approach is that the media belt typically must be narrower than the driver sprocket spacing, and must be attached to the chain since a friction drive is precluded. Also, a second more closely spaced pair of chain loops must be used to insure proper sealing of the belt since the belt must be narrower than the conveyor to avoid having to pass over the drive sprockets. This complexity increases the cost of the media belt and greatly increases the time required to change a media belt when replacement becomes necessary.

Such a filter is described in U.S. Pat. No. 4,514,301 issued on Apr. 30, 1985 for a "Continuous Media Filter" in which the conveyor chain loops and belt are circulated beneath the tank.

In disposable media filters, the chain conveyor loops typically return by being passed back over the top of the tank. See U.S. Pat. Nos. 4,396,505 and 3,221,885 for examples of these disposable media filter apparatus designs.

Another disadvantage of connected media belt and chain conveyors is that cleaning of each is made more difficult as scraping the chain conveyor flights and belt surface is made difficult with these elements always remaining positioned against each other.

Another arrangement heretofore employed has utilized a permanent belt returning over the top of the tank. This arrangement results in the open top of the tank being covered, making observation of conditions and access to the tank interior difficult.

In such permanent media belt filters heretofore employed, it has been difficult to employ a disposable media belt in combination with a permanent media belt, as the disposable belt must be inserted between the chain conveyor and the permanent media, which is not easily accomplished in the prior designs.

SUMMARY OF THE INVENTION

The present invention comprises a permanent media belt filter of the type described in which no connections between the chain conveyor and media belt are necessary, and in which a disposable media may readily be fed through the tank between the chain conveyor loops and permanent media belt.

The chain conveyor flights and the permanent media belt are easily scraped and cleaned after passing out of the tank.

These advantages are achieved by an arrangement in which a chain conveyor friction drive of the permanent belt is provided, the permanent media advanced along the bottom of the tank and across the vacuum box perforate layer as in the prior art. However, in contradistinction to the prior art, the chain conveyor loops and the permanent media belt are guided through paths which diverge after leaving the filter tank and are recirculated through separate routes. The permanent media belt is circulated down around the outside of the tank and across the bottom thereof, returning by ascending the outside of the opposite side of the tank for reentry to the tank interior. Solids may be dumped as each segment of the media belt descends after being indexed to exit the tank, and spray jet cleaning is carried out as the media belt passes beneath the tank.

The chain conveyor loops are guided in a divergent return path extending across the top of the tank for reentry at the opposite side.

Disposable media may be fed off a feed roll, entering the entry space at the point the permanent media belt and conveyor chain loops converge together, at the entrance side of the tank, the permanent media belt and disposable media belt simultaneously frictionally driven by the flight conveyor.

The borders of the permanent media belt are preferably impregnated as with a liquid plastic to improve sealing and resistance to wear.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
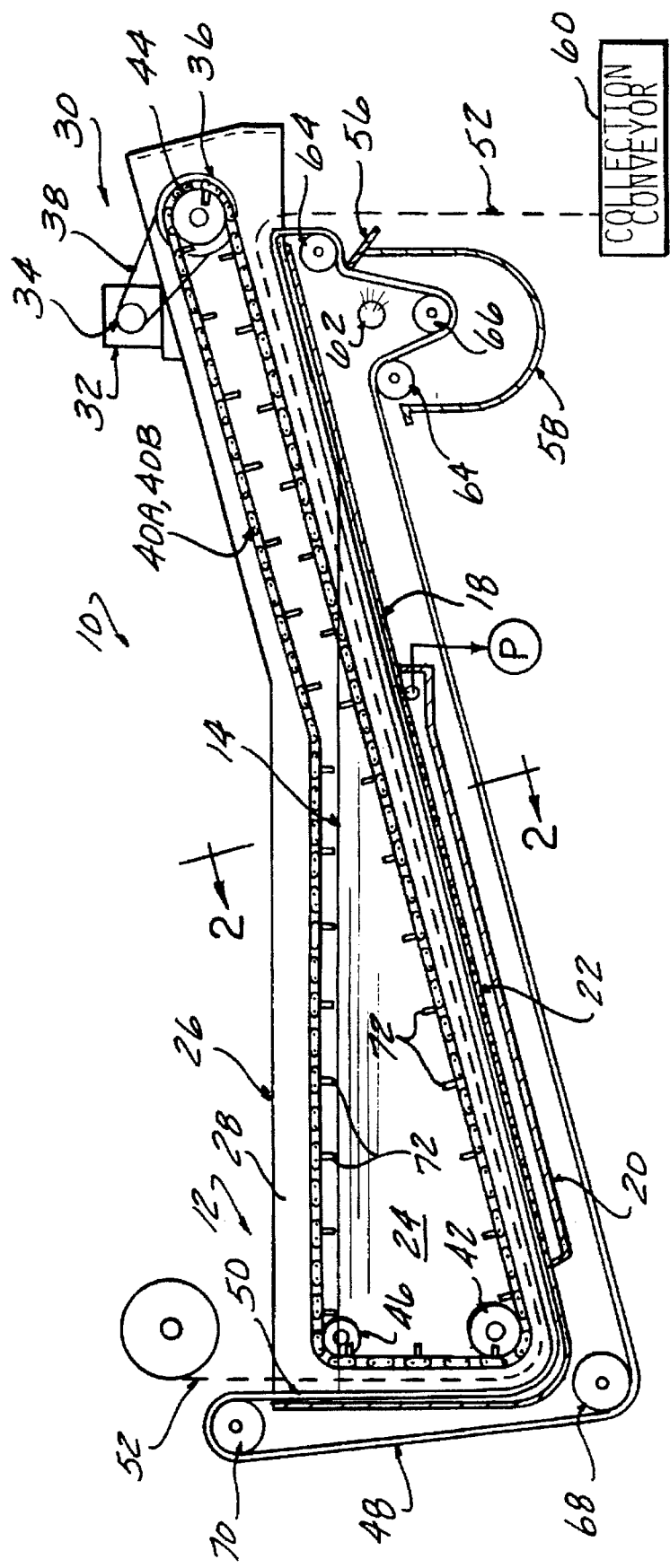
FIG. 1 is a diagrammatic longitudinal sectional representation of a filter apparatus according to the present invention.
Figure 2:
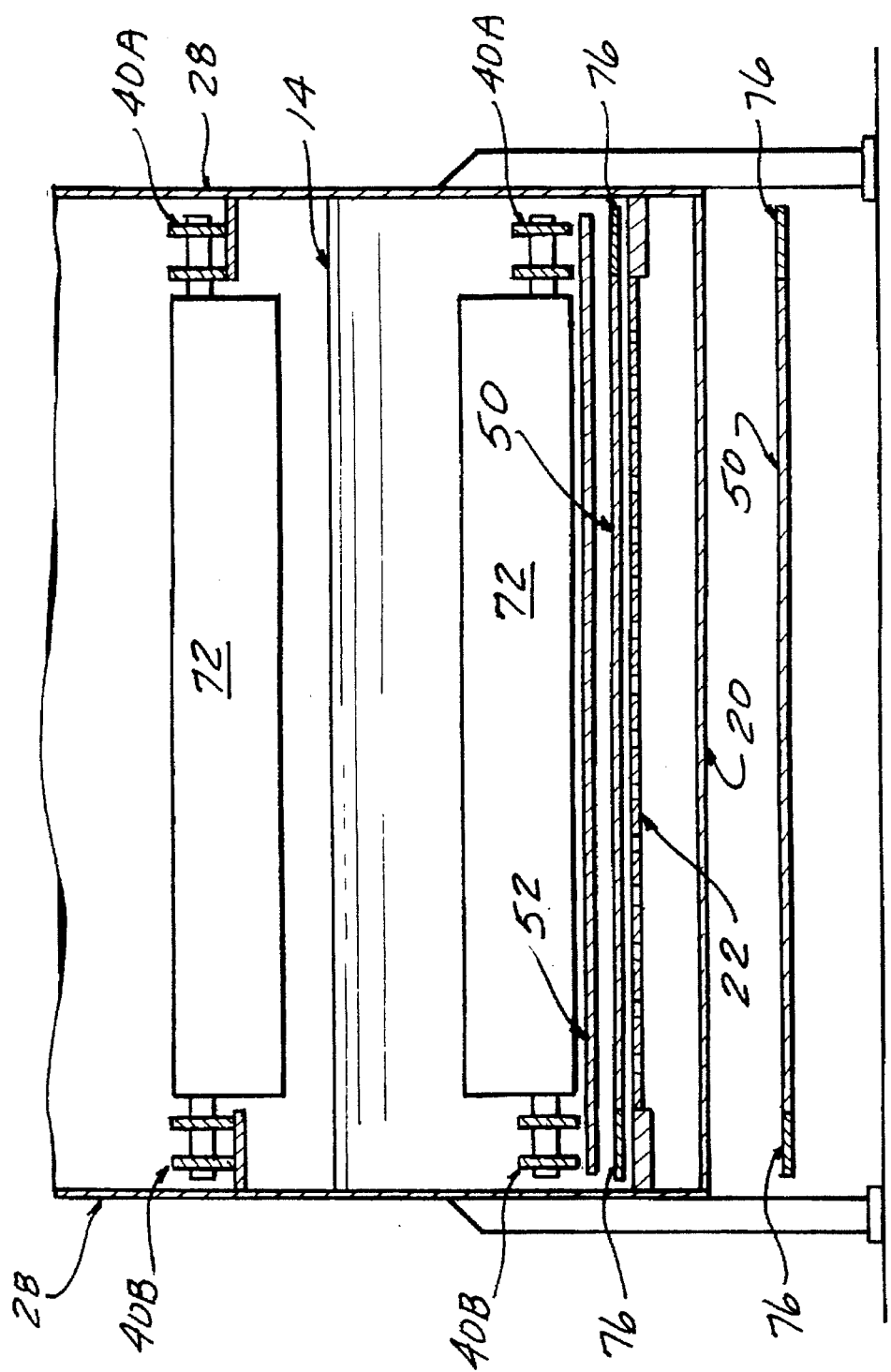
FIG. 2 is a transverse sectional view of the filter apparatus shown in FIG. 1.

Referring to FIGS. 1 and 2, a filter apparatus 10 is depicted, which includes an open tank 12 adapted to receive liquid to be filtered from a utilizing system (not shown), normally operating with a controlled liquid level 14 by means of suitable valving and controls well known to those skilled in the art.

The particular configuration of tank shown includes a vertical rear wall 16 connected via a rounded corner to an upwardly sloping bottom 18. A vacuum or clean liquid box 20 is mounted beneath the tank bottom 18 with a perforate bottom section 22 allowing an outflow of liquid from the tank interior 24 into a collection chamber defined by the clean liquid box 20 induced by a pressure differential created by operation of a pump P having an inlet connected to the clean liquid box 20.

The inclined tank bottom 18 terminates at the height of the horizontal top edge 26 of the pair of sidewalls 28, together defining the confined volume of the interior 22 of the tank 12.

Each sidewall 28 extends beyond the upper end of the tank bottom 18 to create a mounting and receiving structure for a chain conveyor indexing drive assembly 30. Such drive assembly can include a motor 32 and belt or chain rotating a main sprocket 34, in turn driving drive sprockets 36 with a chain 38 to periodically enable an incremental advance of the chain conveyor loops 40A, 40B to bring a fresh segment of a filter media belt loop 48 over the perforate section 22. Suitable indexing drive (and flow valving controls) are well known to those skilled in the art, and are therefore not here described.

A pair of endless conveyor chain loops 40A, 40B (FIG. 2) are guided for circulation around the interior 24 of the tank 12, extending down the rear wall 16, around the sprockets 42, 44, both driven by main drive sprocket 36 and returning across the upper region of the tank interior 24 to second guide sprockets 46.

An endless or continuous permanent filter media belt loop 48 is also provided, having one segment 50 which enters the tank interior 24 by descending the rear endwall 16, beneath the chain conveyor loops 40A, 40B.

The permanent media belt loop 48 must be porous to enable filtration, and may be constructed or woven synthetic of natural fibers forming a fabric of suitable weave tightness for the particular filtering application, as well known to those skilled in the art.

While a pronounced separation is indicated in FIG. 1, it should be understood that this is for clarity of illustration only, and that the rear segment 50 of the permanent media belt loop 48 would be against the endwall 16 and that chain loops 40A, 40B would be immediately above, with the intermediate disposable filter media 52 optionally sandwiched between, as described further below.

The permanent media belt loop 48 extends around the guide sprocket 42 and up the tank bottom 18, over the perforate section 22, to the end of the tank bottom 18. At this point, the permanent media belt 50 takes a divergent path from that of the conveyor chain loops 40A, 40B, passing down over a guide roller 54 located beneath the bottom 18 and rearwardly to a scraper edge 56 affixed to the entry side edge of a wash liquid receiving trough 58. Accumulated solids are dumped as the surface is inverted and scraped off the permanent media belt loop 48 by the scraper edge 56, collected as by a collection conveyor 60 positioned below.

A jet spray manifold pipe 62 is mounted in the collection trough extending across the width of the permanent media belt loop 48 to provide washing of the belt by reverse jets directed at the backside. The wash liquid is collected and may be returned to the tank 24 for filtration.

A pair of guide rollers 64, 66 insures that the permanent media belt loop 48 is looped down into the collection trough 58 for confinement of the wash liquid during the jet wash process.

The permanent media belt loop 48 then passes beneath the tank 12 and clean liquid box 20, passing around guide roller 68, up the outside of rear wall 16 to a guide roller 70 at the top of the rear wall 16 for reentry into the tank 12.

If a disposable media is not employed, indexing advance of the permanent media belt loop 48 is produced by direct frictional engagement of the chain conveyor loops 40A, 40B lying atop the permanent media belt loop 48 as they ascend the tank bottom 18. Flights 22 connect the loops 40A, 40B extending across the width of the media belt 50 which serves to carry the weight of the solid material accumulating atop the permanent media belt loop 48 so that frictional advance of the filter media belt 50 is easily enabled.

The divergent routing of the chain conveyor loops 40A, 40B and the permanent media belt loops 48 after leaving the tank 12 allows a disposable media belt 52 to be inserted into the convergent space between the permanent media belt 50 and conveyor loops 40A, 40B at the point of entry at the rear wall 16 and advanced along with the permanent media belt loop 48 so as to lie along belt loop 48 as indexing advance atop the tank bottom 18 proceeds. In this instance, the conveyor loops 40A, 40B exert a frictional force on the disposable media 52 and the disposable media 52 exerts a frictional force on the permanent media belt loop 48, so as to be simultaneously advanced together when indexing occurs by frictional driving.

The disposable media 52 passes out of the tank 12 at the end of the bottom 18, where it may be collected for disposal.

FIG. 2 shows further details, in which the upper segments of the chain conveyor loops 40A, 40B passing back over the liquid level 14 are supported on tracks 74 welded to the inside of each tank sidewall 28.

The various filter belt segments are shown separated and of exaggerated thickness for clarity of illustration, as it should be understood that the lower segments of the chain conveyor loops 40A, 40B, the disposable media belt 50, and the permanent media belt loop 48 lie directly atop each other.

The edges 76 of the permanent media belt 52 are preferably coated, as by a hot press impregnation with a urethan plastic. This will improve sealing and wear resistance.

Thus, a simple configuration of the permanent media belt loop 48 is achieved which is easily installed and removed and is able to easily be scraped and cleaned. The return segments of the chain conveyor loops 40A, 40B are accessible for scraping and access to the tank interior is not impeded.

A disposable media is easily utilized as an option.

I claim:

1. In a vacuum tank filter of the type having a vacuum box in a tank covered with a perforate plate adapted to be overlain with a filter media belt to carry out filtration of a liquid in the tank, the method of simultaneously indexing sections of both a permanent media belt and a disposable media belt over said perforate plate comprising the steps of:

mounting a permanent filter media belt loop so as to extend along a path through said tank and across said vacuum box perforate cover, out one end of said tank, down around the bottom of said tank and back into the other end of said tank;

circulating said permanent filter media belt through said path solely by frictionally driving a segment of said permanent filter media belt with a powered flight conveyor loop unconnected to said permanent filter media and mounted above said tank by positioning a lower segment of said conveyor to frictionally engage a portion of said permanent filter media belt extending across said vacuum box perforate cover to drive said permanent filter media belt through said path solely by friction to advance successive segments onto said perforate cover;

inserting a section of disposable filter media belt into a convergent space defined between a portion of said conveyor and said permanent filter media belt and frictionally engaging said disposable filter media belt directly with said conveyor to periodically advance said disposable filter media section across said perforate cover and out said one end of said tank, while frictionally driving said permanent media belt indirectly by frictional engagement of said permanent media with said disposable media belt so as to periodically advance both said permanent and said disposable media belt together by said direct engagement of said conveyor with said disposable media belt and indirect engagement with said permanent media belt; and, collecting sections of said disposable filter media belt after driving said section through said tank and exiting said one end of said tank, whereby enabling use of both permanent and disposable media in said tank filter.

\* \* \* \* \*

UNITED STATES PATENT AND TRADEMARK OFFICE
CERTIFICATE OF CORRECTION

PATENT NO. : 5,624,579
DATED : April 29, 1997
INVENTOR(S) : Jack R. Bratten

It is certified that error appears in the above-indentified patent and that said Letters Patent is hereby corrected as shown below:

Column 4, line 30, "occurs by frictional driving" should be --occurs by frictional driving by the flight conveyor--.

Column 4, line 44, "urethan" should be --urethane--.

Signed and Sealed this

Fifth Day of August, 1997

Attest:

BRUCE LEHMAN

Attesting Officer

Commissioner of Patents and Trademarks